(12) United States Patent
Tano et al.

(10) Patent No.: US 7,754,178 B2
(45) Date of Patent: Jul. 13, 2010

(54) RAW-MATERIAL CARBON COMPOSITION FOR CARBON MATERIAL FOR ELECTRODE OF ELECTRIC DOUBLE-LAYER CAPACITOR

(75) Inventors: Tamotsu Tano, Yamaguchi (JP); Takashi Oyama, Yamaguchi (JP); Hideki Ono, Kanagawa (JP); Keizo Ikai, Kanagawa (JP); Kiwamu Takeshita, Tokyo (JP)

(73) Assignee: Nippon Oil Corporation, Tokyo (JP)

( * ) Notice: Subject to any disclaimer, the term of this patent is extended or adjusted under 35 U.S.C. 154(b) by 612 days.

(21) Appl. No.: 11/573,875

(22) PCT Filed: Aug. 12, 2005

(86) PCT No.: PCT/JP2005/014834

§ 371 (c)(1), (2), (4) Date: Mar. 22, 2007

(87) PCT Pub. No.: WO2006/019053

PCT Pub. Date: Feb. 23, 2006

(65) Prior Publication Data

US 2007/0258189 A1    Nov. 8, 2007

(30) Foreign Application Priority Data

Aug. 18, 2004 (JP) .............................. 2004-238668
Sep. 24, 2004 (JP) .............................. 2004-276917

(51) Int. Cl.
*D01F 9/12* (2006.01)
*C01B 31/00* (2006.01)
*C01B 31/02* (2006.01)
*H01G 4/008* (2006.01)

(52) U.S. Cl. .................... 423/445 R; 423/414; 361/305
(58) Field of Classification Search .................. None
See application file for complete search history.

(56) References Cited

U.S. PATENT DOCUMENTS 3,058,821 A * 10/1962 Triska ........................ 75/325
6,738,252 B2 * 5/2004 Okamura et al. ............ 361/502
2004/0131860 A1 * 7/2004 Tano et al. .................. 428/408

FOREIGN PATENT DOCUMENTS

| JP | 06-267794 | 9/1994 |
| JP | 10-199767 | 7/1998 |
| JP | 11-214270 | 8/1999 |
| JP | 2001-208661 | 8/2001 |
| JP | 2001-284188 | 10/2001 |
| JP | 2003-51430 | 2/2003 |

* cited by examiner

*Primary Examiner*—Melvin C Mayes
*Assistant Examiner*—Guinever S Gregorio
(74) *Attorney, Agent, or Firm*—Knobbe Martens Olson & Bear LLP

(57) ABSTRACT

The capacitance per volume of an electric double-layer capacitor can be increased by using a raw-material carbon composition for use in a carbon material for an electrode of the electric double-layer capacitor by applying an activation process, characterized in that the raw-material carbon composition has a volatile content of 1.3% by mass to 15% by mass (both inclusive), and microstrength of 5 to 30% when the volatile content is less than 6% by mass while microstrength of 5 to 20% when the volatile content is 6% or more.

20 Claims, No Drawings

RAW-MATERIAL CARBON COMPOSITION FOR CARBON MATERIAL FOR ELECTRODE OF ELECTRIC DOUBLE-LAYER CAPACITOR

This application is the U.S. National Phase under 35 U.S.C. §371 of International Application PCT/JP2005/014834, filed Aug. 12, 2005, which claims priority to Japanese Patent Application No. 2004-238668, filed Aug. 18, 2004 and Japanese Patent Application No. 2004-276917, filed Sep. 24, 2004. The International Application was published under PCT Article 21(2) in a language other than English.

TECHNICAL FIELD

The present invention relates to a raw-material carbon composition suitable for an electrode material of an electric double-layer capacitor, a carbon material for an electrode using the same, and an electric double-layer capacitor comprising electrodes containing the carbon material for an electrode.

BACKGROUND ART

It has been conventionally considered that the capacitance of an electric double-layer capacitor is almost proportional to the surface area of polarizable electrodes (such as carbon electrodes) provided as an anode and a cathode constituting the electric double-layer capacitor. Therefore, in an attempt to increase capacitance by increasing the surface area of a carbon material of the carbon electrodes when the carbon electrodes are used as polarizable electrodes, various studies have been made.

For example, as a carbon material for a carbon electrode, activated carbon has so far been frequently used. Such activated carbon is generally produced by activating so-called hard-graphitization carbon, which is obtained by carbonizing coconut shell, wood chip, coal and phenol resin, with a gas such as water vapor or with a chemical agent such as an alkali metal hydroxide. However, the activated carbon produced from such hard-graphitization carbon has a problem in that the capacitance per unit volume does not increase proportionally with an increase of the specific surface area. To explain more specifically, in either one of activation reactions of hard-graphitized carbon with a gas or a chemical agent, fine pores are formed from the surface of a particle by an oxidative reaction. Therefore, as the activation reaction proceeds, the amount of loss due to oxidation increases. As a result, the activated carbon is low in bulk density. When such activated carbon is used in an electrode material, the bulk density of the resultant electrode decreases. Therefore, even if the capacitance per unit mass of the electrode increases, an increase of density of capacitance per unit volume of the electrode is limited. In addition, such activated carbon is low in electric conductivity due to hard-graphitization carbon. Because of this, the internal resistance of the electrode increases.

On the other hand, activated carbon obtained by activating easy-graphitization carbon has been proposed, which is obtained by infusibilizing/carbonizing mesophase pitch and a mesophase pitch carbon fiber obtained by spinning the mesophase pitch or by carbonizing petroleum coke and coal-tar pitch coke, etc., with an alkali metal hydroxide. When the easy-graphitization carbon is activated with an alkali metal hydroxide, activated carbon is produced in high yield and with high bulk density. Therefore, an electrode having a high bulk density can be formed. Furthermore, the density of capacitance per unit volume can be increased. Moreover, the activated carbon produced from the easy-graphitization carbon generally has a high electrical conductivity compared to that produced from hard-graphitization carbon. Therefore, the activated carbon produced from the easy-graphitization carbon has also an advantage of easily reducing the internal resistance of an electrode.

However, the mesophase pitch and a mesophase pitch carbon fiber obtained by spinning the mesophase pitch are expensive materials themselves. In addition to this problem, there is another problem in that since an infusibilizing/carbonizing process must be performed prior to an activation process, manufacturing steps becomes complicated, raising manufacturing cost more and more. A still another problem resides in that since oxygen is introduced by an infusibilizing reaction, the degree of graphitization decreases, with the result that the internal resistance of an electrode does not decrease so much.

On the other hand, JP-A-10-199767 (Patent Document 1) proposes a method of carbonizing petroleum coke or coal pitch coke to obtain a product satisfying conditions: a volatile content of 1.0 to 5.0 wt. % and an H/C atom ratio of 0.05 to 0.30, followed by activating the product with an alkali metal hydroxide.

Furthermore, JP-A-2003-51430 (Patent Document 2) describes that a raw-material carbon composition, which has an HGI (Hardgrove Grindability Index, defined by ASTMD-409-71) of 50 or more, a microcrystalline-carbon interlayer distance: $d_{002}$ of 0.343 nm or less, and a lattice constant of crystal: $Lc_{002}$ of 3.0 nm or less, is activated with an alkali, and that a carbon material for an electrode of an electric double-layer capacitor having a large capacitance per unit volume can be obtained.

Patent Document 1: JP-A-10-199767
Patent Document 2: JP-A-2003-51430

DISCLOSURE OF THE INVENTION

Problems to be Solved by the Invention

However, the capacitance per unit volume of the electrode material using a carbon material, which is obtained in accordance with the method set forth in Patent Document 1, is not yet said to be sufficient. According to the studies conducted by the present inventors, they found that a carbonized material obtained from petroleum coke or coal pitch coke in such a manner that it has a predetermined volatile content and H/C atom ratio as described in Patent Document 1, is excessively carbonized and thus a specific surface area obtained by an activation process is insufficient. Patent Document 2 refers to physical properties of a raw-material carbon composition; however, these physical properties are not used as indexes indicating that the resultant capacitor shows sufficient performance in respect of capacitance. In either case, further improvement is required in order to satisfy the recent requirement for high performance of a capacitor having a capacitance exceeding 30 F/cc.

The present invention was made in view of these problems. An object of the present invention is to provide a raw-material carbon composition that can provide an electrode material capable of producing an electric double-layer capacitor having a high-level capacitance.

Means for Dissolving the Problems

The present inventors conducted intensive studies with a view to overcome the aforementioned problems. As a result, they have given an eye on the strength of a raw-material carbon composition, particularly, microstrength, and found that high-level capacitance and reduction of internal resistance can be simultaneously attained by controlling the microstrength to fall within a predetermined range, thereby facilitating formation of fine pores in activated carbon. They further found that it is important to define the degree of microstrength depending upon the content of a volatile component.

More specifically, the present invention is directed to the following items.

1. A raw-material carbon composition for use in a carbon material for an electrode of an electric double-layer capacitor by applying an activation process, characterized in that a volatile content is 1.3% by mass to 15% by mass (both inclusive), and a microstrength is 5 to 30% when the volatile content is less than 6% by mass and the microstrength is 5 to 20% when the volatile content is 6% or more.

2. The raw-material carbon composition according to item 1, characterized by comprising microcrystalline carbon analogous to graphite.

3. The raw-material carbon composition according to item 1, characterized in that the volatile content is not less than 1.3% by mass and less than 6% by mass and porosity is 20 to 30%.

4. The raw-material carbon composition according to item 1, characterized in that the volatile content is 6 to 15% by mass and an average interlayer distance $d_{002}$ of a graphite crystal obtained by X-ray diffraction is 0.3445 nm or less.

5. A carbon material for an electrode of an electric double-layer capacitor obtained by applying an activation process to the raw-material carbon composition according to any one of items 1 to 3.

6. The carbon material for an electrode of an electric double-layer capacitor according to item 5, characterized in that the activation process is one using an alkali metal compound.

7. The carbon material for an electrode of an electric double-layer capacitor according to item 6, characterized in that the alkali metal compound is sodium hydroxide.

8. A carbon material for an electrode of an electric double-layer capacitor characterized by having a specific surface area of 1800 $m^2/g$ or more by activating the raw-material carbon composition according to item 4.

9. The carbon material for an electrode of an electric double-layer capacitor according to item 8, characterized in that the activation process is one using an alkali metal compound.

10. An electric double-layer capacitor characterized by comprising an electrode containing the carbon material for an electrode according to any of items 5 to 9.

EFFECTS OF THE INVENTION

It is possible to obtain an electric double-layer capacitor having a large capacitance per volume and a low internal resistance by using an electrode carbon-material (activated carbon), which is obtained by activating a raw-material carbon composition according to the present invention, in an electrode of an electrode double-layer capacitor. In the present invention, the microstrength of a raw-material carbon is controlled appropriately. Therefore, proper fine pores are formed by an activation process. Because of this, it is considered that an electrode carbon-material providing a large capacitance can be obtained.

BEST MODE FOR CARRYING OUT THE INVENTION

The term "microstrength" defined in the present invention refers to a kind of index indicating degree of grinding characteristics by a ball mill, which is measured in accordance with the method of H. E. Blayden. A value of 100% means that a material is not substantially ground, whereas a value of 0% means that a material is easily ground. Note that there are other indexes indicating the strength of coke, such as the results of a drum strength test or a shatter strength test. These strength tests are influenced by cracks in coke and indicate the strength of massive coke, whereas the microstrength indicates the intrinsic strength of coke, in other words, the strength mainly derived from the strength of pore wall.

A method of measuring microstrength will be more specifically explained below. To a steel cylinder (inner diameter: 25.4 mm, length: 304.8 mm), a sample (2 g) having a mesh size of 20 to 30 and 12 steel balls having a diameter of about 7.9 mm (5/16 inches) are placed. The vertical plane is rotated in the perpendicular direction to the cylinder at 25 rpm 800 times (more specifically, the cylinder is rotated like a propeller about a horizontal rotation axis so as to turn the cylinder (upright posture) upside down). After rotation, the ground particles are separated by a sieve having a mesh size of 48. The particles remaining on the sieve are weighed and expressed in terms of percentage relative to the original weight of the sample.

Patent Document 2 mentioned above describes a raw-material carbon composition having an HGI (Hardgrove Grindability Index, defined by ASTMD-409-71) of 50 or more, preferably 50 to 80. The relationship between microstrength and HGI is as follows. As microstrength increases (meaning that hardness increases in terms of microstrength), HGI decreases (meaning that hardness increases in terms of HGI) in a certain region, whereas, in another region, as microstrength increases, HGI also increases (meaning that hardness decreases in terms of HGI). From this, it is considered that there is no correlation between them. This may be because the microstrength indicates the strength of a pore wall, whereas HGI indicates bulk strength.

Therefore, the raw-material carbon composition of the present invention may be defined not only by a value of microstrength but also by a HGI of 50 to 80, or alternatively, by a value other than these.

The "volatile content" according to the present invention is measured in accordance with a method described in JIS M8812 "coal and coke—industrial analysis".

The "average interlayer distance $d_{002}$ of a graphite crystal obtained by X-ray diffraction" according to the present invention refers to the average interlayer distance ($d_{002}$) of the layers corresponding to the lattice plane (002) of microcrystalline carbon, which is measured by an X-ray diffraction method as follows. The X-ray diffraction is measured by mixing 15% of silicon powder to a sample (raw-material carbon composition), charging a measurement cell with the mixture, applying a CuKα ray from the source, measuring a wide angle X-ray diffraction pattern in accordance with a reflective diffractometer method, and obtaining an average interlayer distance ($d_{002}$) of layers corresponding to the (002) plane based on the method specified by the Japan Society for the Promotion of Science.

The present invention can be divided into two aspects depending upon the volatile content of a raw-material carbon composition. In the first aspect, the volatile content is defined as not less than 1.3% by mass to less than 6% by mass, whereas, in the second aspect, the volatile content is 6% by mass to 15% by mass (both inclusive). The microstrength herein serves as an index indicating a carbonization degree when a heat process is performed to increase the carbonization degree within the range of a volatile content from not less than 1.3% by mass to less than 6% by mass, whereas it serves as an index indicating a degree of quality (texture) of raw coke within the range of a volatile content from 6% by mass to 15% by mass (both inclusive).

First, the first aspect will be explained.

According to the first aspect, the microstrength of a raw-material carbon composition is 5 to 30% and preferably 5 to 20%, as described above. The value of the microstrength can be varied by changing a type of starting oil in producing a raw-material carbon composition and/or by appropriately selecting a temperature for carbonization in producing a raw-material carbon composition.

According to the first aspect, a raw-material carbon composition preferably has microcrystalline carbon analogous graphite. The "microcrystalline carbon analogous graphite" refers to microcrystalline carbon, which is analogous to graphite but has a laminate irregularly stacked, unlike the case of graphite having a laminate regularly stacked (for example, see "J. Biscoe and B. E. Warren, J. Appl. Phys., 13, 364 (1942)").

More specifically, the X-ray diffraction analysis shows a sharp peak (as a diffraction peak) at an average interlayer distance $d_{002}$=0.335 nm in graphite. However, in the case of microcrystalline carbon analogous to graphite, a broad diffraction peak is observed in a wider range of interlayer distance $d_{002}$ than graphite. According to the first aspect, a raw-material carbon composition is preferably has an average interlayer distance $d_{002}$ of 0.3470 nm or less. When the $d_{002}$ exceeds 0.347 nm, graphite crystals are not sufficiently grown, with the result that an appropriate specific surface area may not be obtained by an activation process in some cases. In particular, when activation is performed by an alkali metal compound, the alkali metal generated during the activation process is unlikely to enter into the space between layers of a graphite crystal. For the reason, it is difficult to obtain an optimal specific surface area. On the other hand, in view of obtaining further higher specific surface area, the lower an average interlayer distance $d_{002}$, the more preferable. In general, an average interlayer distance $d_{002}$ would not be less than a theoretical value (0.3354 nm) of a graphite crystal.

According to the first aspect, the volatile content of a raw-material carbon composition is not less than 1.3% by mass to less than 6% by mass, as described above. However, in particular, it is preferably not less than 1.5% by mass and further preferably not more than 5% by mass. In this range, carbonization of the raw-material carbon composition proceeds and reactivity of the composition (for example, reactivity with an activator such as alkali metal hydroxide) in an activation process is relatively low. Therefore, there are some cases where a large specific surface area may not be obtained after the activation process; however, when the activated carbon material (activated carbon) is used in a capacitor, a large capacitance can be obtained. This may be because the strength of pore-wall represented by microstrength is sufficiently enough to form fine pores, by which appropriate capacitance can be provided.

Furthermore, according to the first aspect, a raw-material carbon composition preferably has a porosity of 20 to 30%. This is because when the porosity is excessively small, desired fine pores cannot be obtained by the following activation process; and conversely, when the porosity is excessively large, the activation reaction proceeds excessively. Note that the porosity can be obtained from an apparent density (AD), which is obtained by a picnometer using a sample (30 g) having particles of a mesh size of 3.5 to 4 in accordance with a water displacement method, and a real density (RD), which is obtained by a picnometer using a sample (10 g) having particles of a mesh size of 200 in accordance with n-butyl alcohol displacement method, in accordance with the following equation:

$$\text{Porosity}(\%) = (1 - AD/RD) \times 100.$$

According to the first aspect, the raw-material carbon composition has the aforementioned specific properties. The material of the raw-material composition is not particularly limited; however, it preferably has the properties of easy-graphitization carbon. The carbon material produced from such easy-graphitization carbon has a high electrical conductivity compared to that produced from hard-graphitization carbon, with the result that the internal resistance of the obtained electrode is likely to decrease. The easy-graphitization carbon can be obtained by sintering an aliphatic polymer such as a vinyl chloride resin and polyacrylonitrile as well as an aromatic polymer compound such as tar, mesophase pitch or polyimide at about 800° C. or less. Besides this, petroleum coke and coal coke, which are obtained by sintering pitch materials such as petroleum pitch and coal pitch, can be used as the easy-graphitization carbon. Of them, petroleum coke and coal coke are preferably used in view of cost and internal resistance of the resultant electric double-layer capacitor, and particularly, petroleum coke is preferably used.

Next, a method of producing a raw-material carbon composition according to the first aspect will be explained. Generally, as a carbonization temperature increases, the volatile content decreases. Accordingly, an average interlayer distance $d_{002}$ decreases. However, the relationship between the volatile content and the average interlayer distance $d_{002}$ varies depending upon the properties of raw material oil and carbonization conditions.

For example, a raw-material carbon composition according to the first aspect can be obtained by carbonizing a raw material oil (e.g., petroleum heavy oil), which has a sulfur content of not more than 0.4% by mass, preferably not more than 0.2% by mass and an asphaltene content of not more than 2.0% by mass, preferably not more than 1.0% by mass, at a temperature of 400° C. to 900° C., preferably 430° C. to 800° C., generally for about 0.5 to 100 hours under an inert atmosphere. The carbonization process may be carried out in multiple steps.

Next, the second aspect will be explained.

According to the second aspect, a raw-material carbon composition is characterized by having a volatile content of 6 to 15% by mass, an average interlayer distance $d_{002}$ (obtained by X-ray diffraction) of a graphite crystal is not more than 0.3445 nm and a microstrength of 5 to 20%. In particular, the raw-material carbon composition according to the second aspect is characterized by providing an activated carbon material having a relatively large specific surface area.

The volatile content of the raw-material carbon composition according to the second aspect is at least 6% by mass, preferably 6.5% by mass and further preferably 7.0% by mass. In particular, to obtain a specific surface area as large as not less than 1800 m$^2$/g by activation, it is effective to have a volatile content of not less than 6% by mass. On the other hand, the upper limit of the volatile content is 15% by mass and preferably 12% by mass. When the volatile content exceeds 15% by mass, the average interlayer distance $d_{002}$ of a graphite crystal cannot satisfy the aforementioned specific range.

In the raw-material carbon composition according to the second aspect, the upper limit of the average interlayer distance $d_{002}$ of a graphite crystal obtained by X-ray diffraction is 0.3445 nm, preferably 0.3440 nm and further preferably 0.3435 nm. When the average interlayer distance $d_{002}$ exceeds 0.3445 nm, crystallization of graphite does not sufficiently proceed, with the result that a large specific surface area cannot be obtained by an activation process. In particular, when the activation process is performed by an alkali metal compound, it is difficult for an alkali metal produced in the activation process to enter into the space between layers of a graphite crystal, with the result that a large specific surface cannot be obtained. On the other hand, in view of obtaining a further larger specific surface area, the lower the average interlayer distance $d_{002}$, the more preferable. However, in general, the average interlayer distance $d_{002}$ would not be less than a theoretical value (0.3354 nm) of a graphite crystal.

The microstrength value of the raw-material carbon composition according to the second aspect is preferably 5 to 20% and particularly 7 to 15%. Also in the raw-material carbon composition according to the second aspect, when the microstrength is excessively large, the pore-wall becomes excessively hard, with the result that necessary fine pores are unlikely to be formed in the following activation process. Conversely, when the microstrength is excessively low, the reaction of the activation process easily proceeds; however, fine pores suitable for an electric double-layer capacitor are unlikely to be formed. Therefore, the raw-material carbon composition must have an appropriate strength. It is considered that proper fine pores may be formed when a microstrength value is 5 to 20% under the conditions where a volatile content is 6 to 15% by mass and an average interlayer distance $d_{002}$ of a graphite crystal is not more than 0.3445 nm. The microstrength value can be changed by appropriately selecting the temperature of a carbonization process.

According to the second aspect, the raw-material carbon composition has the aforementioned specific properties. The material of the raw-material composition is not particularly limited; however, it is preferably a material based on a petroleum coke which has the properties of easy-graphitization carbon. The carbon material produced from such easy-graphitization carbon has a high electrical conductivity compared to that produced from hard-graphitization carbon, with the result that the internal resistance of the obtained electrode is likely to decrease.

Next, a method of producing a raw-material carbon composition according to the second aspect will be explained. Generally, as a carbonization temperature increases, the volatile content decreases. Accordingly, an average interlayer distance $d_{002}$ decreases. On the other hand, the relationship between the volatile content and the average interlayer distance varies depending upon the properties of raw-material oil and carbonization conditions. The raw-material carbon composition according to the second aspect can be produced, for the first time, by the following method performed under strict conditions with respect to a raw-material oil and carbonization, which are set so as to produce graphite crystals in the early stage of carbonization where a volatile content is high.

To explain more specifically, a raw-material carbon composition according to the second aspect can be obtained by carbonizing a raw-material oil (e.g., petroleum heavy oil), which has a sulfur content of not more than 0.4% by mass, preferably not more than 0.3% by mass and an asphaltene content of not more than 2.0% by mass, preferably not more than 1.7% by mass, at a temperature of 400° C. to 500° C., preferably 430° C. to 480° C., generally for about 3 to 100 hours under an inert atmosphere. Note that when the sulfur content exceeds 0.4% by mass or the asphaltene content exceeds 2.0% by mass in the above, a three dimensional structure is formed by a crosslinking reaction during a carbonization process. As a result, it is difficult to obtain the raw-material carbon composition according to a second aspect. Furthermore, when carbonization is performed at a temperature exceeding 500° C., a three dimensional structure is also formed because the carbonization rapidly proceeds. Thus, it is difficult to obtain the raw-material carbon composition according to a second aspect. On the other hand, when carbonization is performed at a temperature of less than 400° C., carbonization does not proceed. In this case, it is difficult to reduce a volatile content to not more than 15% by mass. Also when the time for a carbonization process is less than 3 hours, carbonization does not proceed and thus it is difficult to reduce the volatile content to not more than 15% by mass.

<Carbon Material for Electrode>

The raw-material carbon composition thus prepared is subjected to an activation process to obtain a carbon material for use in an electrode of an electric double-layer capacitor. The activation process includes an activation reaction with a chemical agent or a gas, preferably the activation reaction with a chemical agent; particularly, the activation reaction with an alkali metal compound is more preferably used. According to the activation process with an alkali metal compound, since an alkali metal enters into the space between layers of graphite crystals and reacts therein, the specific surface area of the obtained carbon material is more improved.

As the alkali metal compound, various types of carbonates and hydroxides may be used. Specific examples thereof include sodium carbonate, potassium carbonate, potassium hydroxide, sodium hydroxide, lithium hydroxide, rubidium hydroxide and cesium hydroxide. Of them, alkali metal hydroxides such as potassium hydroxide and sodium hydroxide are preferable. These alkali metal compounds may be used in a mixture of two or more types. For example, potassium hydroxide may be used in combination with sodium hydroxide. Of them, sodium hydroxide is particularly preferable.

The activation method, typically, an activation reaction with a chemical agent, is performed by mixing a raw-material carbon composition and an activating agent such as an alkali metal compound and heating the mixture. The mixing ratio of a raw-material carbon composition and an activating agent such as an alkali metal hydroxide is not particularly limited; however, generally, the ratio of a raw-material carbon composition to an activating agent in terms of mass preferably falls within the range of 1:0.5 to 1:10, and more preferably, 1:1 to 1:5. Generally, when the amount of an activating agent such as an alkali metal compound is excessively low, the activation reaction will not sufficiently proceed, with the result that a requisite specific surface area is unlikely to be obtained. In contrast, when the amount of an activating agent such as an alkali metal compound is excessively high, the specific surface area increases; however, the cost of the activation process increases and the yield of an activated product decreases. Furthermore, a bulk density of the resultant carbon material decreases and the capacitance per unit volume is likely to decrease.

The heating temperature during an activation process with a chemical agent is not particularly limited. However, the lower limit thereof is generally 500° C. and preferably 600° C., and the upper limit thereof is generally 1000° C., preferably 900° C. and further preferably 800° C. Generally, when the temperature of an activation process is low, the activation process will not proceed, with the result that a sufficient specific surface area may not be likely to be obtained. In contrast, when the temperature of an activation process is excessively high, the specific surface area also decreases, with the result that the capacitance per unit volume may be likely to decrease. The heating time during an activation process is not particularly limited; however, generally from about 10 minutes to 10 hours, preferably from about 30 minutes to 5 hours. Note that, in an activation process, a raw-material carbon composition is desirably heated together with an activating agent under a non-oxidation atmosphere.

In the case where an activation process is performed with a gas, for example, a method of heating a raw-material carbon composition under a weak acidic activating gas such as carbon dioxide (combustion gas), oxygen, hydrogen chloride, chlorine, and water vapor may be mentioned. It is desirable that the temperature in this case is generally from about 500° C. to 1000° C. Note that an activation method with a gas may be performed in combination with an activation method with a chemical agent.

Such an activation reaction can be performed in any one of an electric furnace, immobilized bed, fluidized bed, movable bed, and rotary kiln.

When a raw-material carbon composition according to the first aspect is activated, it is not necessary that the specific surface area is not particularly large. The specific surface area obtained by a BET method falls within the range of 200 to 2500 $m^2/g$ and preferably 500 to 2000 $m^2/g$. The reason, why fine pores suitable for generating a capacitance are obtained although the specific surface area is not particularly large, is not yet elucidated; however, the present inventors consider that the hardness of a pore wall of a raw-material carbon may influence the formation of fine pores responsible for capacitance when the raw-material carbon composition is activated. More specifically, it is considered that when the pore wall is too hard, fine pores may not be formed; on the other hand, when the pore wall is soft, an activation reaction easily proceeds but fine pores suitable for an electric double-layer capacitor may not be formed.

On the other hand, when a raw-material carbon composition according to the second aspect is activated, it is possible to obtain a carbon material for an electrode having a specific surface area of not less than 1800 $m^2/g$ and preferably not less than 1900 $m^2/g$ as measured by the BET method. To be more specifically, a raw-material carbon composition according to the second aspect not only contains a highly volatile component having a good reactivity with an alkali metal in a predetermined amount, but also has a crystal structure, which facilitates the alkali metal to enter between layers of a graphite crystal and react within the crystal particle. Since these phenomena work in concert, a carbon material having an extremely high-level of specific surface area can be obtained.

Note that when an easy-graphitization carbon is used as the raw-material carbon composition of the present invention and it is activated with an alkali metal hydroxide, a specific surface area is produced by the following mechanisms. More specifically, the specific surface area can be increased not only by a mechanism where fine pores are formed from the surface of a particle by an oxidation reaction, as is in the case where a hard-graphitization carbon such as coconut-shell carbon is activated with a gas, but also by a mechanism where fine pores are formed from the inside of the particle through a direct reaction between carbon and an alkali metal decomposed and entered into the space between layers of a graphite crystal. To allow the alkali metal to enter into carbon, it is important that a graphite crystal of carbon is sufficiently grown. Therefore, to produce a sufficient specific surface area through an activation reaction with such an alkali metal hydroxide, it is necessary for a raw-material carbon composition to have sufficient crystallinity to allow an alkali metal to enter therein and sufficient reactivity with the alkali metal. The raw-material carbon composition of the present invention satisfies these conditions.

The carbon material for an electrode according to the present invention thus obtained preferably has various physical properties set forth below. For example, the volume of fine-pores is preferably 0.60 to 1.30 $cm^3/g$ and more preferably 0.70 to 1.20 $cm^3/g$. An average fine-pore diameter is preferably 1.5 to 2.5 nm and more preferably 1.7 to 2.3 nm. As the carbon material for an electrode, the lower the sulfur content, the more preferable. Such a sulfur content is particularly preferably 500 ppm or less.

The raw-material carbon composition of the present invention is activated in this manner, and then, subjected to a washing step with an acid, a washing step with water, a drying step and a grinding step to form a carbon material for an electrode of an electric double-layer capacitor. When an alkali metal compound is used as an activating agent, the amount of an alkali metal remaining in the carbon material is not particularly limited as long as it is contained in an amount lower than the level which may have an adverse effect on the resultant electric double-layer capacitor, and (is preferably contained in an amount of 1000 ppm or less). In general, washing is desirably performed so as to obtain wastewater having a pH of about 7 to 8; at the same time, to remove an alkali metal component as much as possible. Furthermore, it is desirable that the grinding step is performed in accordance with a known method to obtain fine particles having an average diameter of about 0.5 to 50 µm and preferably about 1 to 20 µm.

<Electric Double-Layer Capacitor>

Now, the electric double-layer capacitor of the present invention will be explained. The electric double-layer capacitor of the present invention is characterized by comprising electrodes containing an electrode carbon-material as prepared in the above.

The electrodes each are constituted of an electrode carbon-material and a binder, and further preferably constituted of these components and a conductive agent. Furthermore, the electrode may be integrally formed with a current collector.

As the binder used herein, a known binder can be used. Examples of the known binder include polytetrafluoroethylene, polyvinylidene fluoride, polyethylene, polypropylene, crosslinked fluoroolefin/vinyl ether copolymer, carboxymethylcellulose, polyvinylpyrrolidone, polyvinyl alcohol and polyacrylic acid. The content of a binder in an electrode is not particularly limited; however, in general, appropriately selected from the range of about 0.1 to 30% by mass based on the total amount of the electrode carbon-material and the binder.

As the conductive agent, a powder such as carbon black, powdery graphite, titanium oxide or ruthenium oxide may be used. The content of the conductive agent in an electrode may be appropriately selected depending upon the purpose to be blended; however, generally selected from the range of about 1 to 50% by mass and preferably about 2 to 30% by mass, based on the total amount of the electrode carbon material, binder and conductive agent.

As a method for blending the electrode carbon-material, binder and conductive agent, a known method is appropriately used. For example, use may be made of a method of applying slurry, which is prepared by adding a solvent having properties of dissolving the binder to the aforementioned components, onto a current collector uniformly, and a method of kneading the aforementioned components in the absence of a solvent and molding the mixture at a room temperature or while heating under pressure.

As the current collector, one formed of a known material in a known shape can be used. Examples of the known material may include metals such as aluminum, titanium, tantalum and nickel and alloys such as stainless steel.

A unit cell of the electric double-layer capacitor of the present invention is formed by employing a pair of electrodes mentioned above as a positive electrode and a negative electrode, facing them with a separator (polypropylene fiber nonwoven cloth, glass fiber nonwoven cloth, synthetic cellulose or the like) interposed between them, and soaking the resultant construct in an electrolytic solution.

As the electrolytic solution, a known aqueous electrolytic solution and organic electrolytic solution may be used; however, an organic electrolytic solution is more preferably used. As such an organic electrolytic solution, a solvent used in an electrolytic solution in the electrochemical field can be used. Examples thereof may include propylene carbonate, ethylene carbonate, butylene carbonate, γ-butyrolactone, sulfolane, sulfolane derivatives, 3-methylsulfolane, 1,2-dimethoxyethane, acetonitrile, glutaronitrile, valeronitrile, dimethylformamide, dimethylsulfoxide, tetrahydrofuran, dimethoxyethane, methylformate, dimethyl carbonate, diethyl carbonate and ethylmethylcarbonate. Note that these electrolytic solutions may be used in mixture.

A supporting electrolyte in an organic electrolytic solution is not particularly limited; however, various types of materials such as salts, acids and alkalis, generally used in the electrochemical field and the battery fields, may be used. For example, mention may be made of salts of inorganic ions such as an alkali metal salt and alkali earth metal salt, quaternary ammonium salts, cyclic quaternary ammonium salts and quaternary phosphonium salts. Mention is preferably made of $(C_2H_5)_4NBF_4$, $(C_2H_5)_3(CH_3)NBF_4$, $(C_2H_5)_4PBF_4$ and $(C_2H_5)_3(CH_3)PBF_4$. The concentration of each of these salts in an electrolytic solution is generally appropriately selected from the range of about 0.1 to 5 mol/l and preferably about 0.5 to 3 mol/l.

A specific structure of an electric double-layer capacitor is not particularly limited. However, mention may be made of a coin structure in which a pair of thin-sheet or disk-form electrodes (positive and negative electrodes) having a thickness of 10 to 500 μm are placed with a separator interposed between them and housed in a metal case, a coil structure in which a pair of electrodes with a separator interposed between them are coiled, and a laminate structure in which a plurality of electrodes are stacked with a separator interposed between them.

The present invention will be more specifically described based on Examples and Comparative Examples, which will not be construed as limiting the invention. Note that physical properties of the raw-material oils, resultant raw-material carbon compositions and carbon materials obtained by activation in Examples and Comparative Examples, were measured as follows.

(1) Sulfur content

Sulfur content was measured in accordance with the method described in JIS M8813 "coal and coke—Elemental Analysis".

(2) Asphaltene content

Asphaltene content was measured in accordance with the method described in IP 143/90 "Determination of Asphaltenes (Heptane Insolubles)".

(3) Volatile content

Volatile content was measured in accordance with the method described in JIS M8812 "coal and coke—Industrial Analysis".

(4) Average interlayer distance ($d_{002}$) of graphite crystal

The "average interlayer distance $d_{002}$ of the (002) plane was obtained based on the method specified by the Japan Society for the Promotion of Science by mixing 15% of silicon powder to a sample (raw-material carbon composition), charging a measurement cell with the mixture, applying a CuKα ray from the source, measuring a wide angle X-ray diffraction pattern in accordance with a reflective diffractometer method by use of an X-ray diffraction apparatus (manufactured by Rigaku Corporation, trade name: RINT1400 VX).

(5) Observation under polarization microscope

Using a microscope having a polarizer and an analyzer as polarizing plate, a test substance was observed under the condition of crossed Nicols where these vibration directions were crossed in perpendicular. If the specimen is isotropic, the field of vision of the specimen placed on a sample table is dark. The field of vision does not change even if the sample table is rotated. On the other hand, if the specimen is optically anisotropic, the field of vision regularly changes light and dark if the sample table is rotated.

Example 1

(i) Production of Raw-Material Carbon Composition

To 90% by volume of bottom oil of a fluid catalytic cracking apparatus for petroleum heavy oil, 10% by volume of the residue oil of a vacuum distillation apparatus was blended to prepare a heavy oil mixture (sulfur content: 0.17% by mass, asphaltene amount: 0.9% by mass). The heavy oil mixture was carbonized (coking) at 500° C. for one hour to obtain a raw-material carbon composition having a volatile content of 5.8% by mass and microstrength of 7%. Note that the raw-material carbon composition thus obtained had an optically anisotropic texture as observed by a polarization microscope and a flow pattern was dominated. Furthermore, an average interlayer distance $d_{002}$ of microcrystalline carbon was 0.346 nm and porosity was 22%.

(ii) Production of Carbon Material

Potassium hydroxide was blended in an amount of 200 parts by mass with 100 parts by mass of the above raw-material carbon composition. An activation reaction was performed at 750° C. for one hour in a nitrogen gas atmosphere. After the reaction, the reaction mixture was washed with water and then with an acid (using HCl) to remove metallic potassium remaining on the carbon material, and dried to obtain a carbon material for an electrode of an electric double-layer capacitor. The specific surface area of the carbon material was 1980 m²/g. The fine-pore volume was 0.95 cm³/g and the fine-pore diameter was 1.9 nm.

(iii) Formation of Electrode

To 80 parts by mass of the carbon material which was ground into an average diameter of 10 μm, 10 parts by mass of carbon black and 10 parts by mass of polytetrafluoroethylene powder were added. The mixture was kneaded in a mortar until paste was obtained. The obtained paste was rolled by a roller press of 180 kPa to form an electrode sheet of 200 μm in thickness.

(iv) Assemble of Cell

Two disks of 16 mm in diameter were punched out from the electrode sheet and dried under vacuum at 120° C., at 13.3 Pa (0.1 Torr) for 2 hours. Thereafter, vacuum impregnating of an organic electrolytic solution (a solution of triethylmethylammonium tetrafluoroborate in propylene carbonate, concentration: 1 mole/L) to the disks was performed in a glove box under a nitrogen atmosphere having a dew point of −85° C. Next, two electrodes were used as a positive electrode and a negative electrode, respectively. A glass fiber separator (manufactured by ADVANTEC, trade name: GA-200, thickness: 200 μm) was interposed between the electrodes and an aluminum-foil collectors were provided to both ends. The resultant construct was installed in a bipolar cell manufactured by Hosen Corporation to form an electric double-layer capacitor (coin-form cell).

(v) Measurement of Capacitance

The coin-form cell was charged with a constant current of 10 mA per 1 F up to 2.7 V. After completion of charging, the coin-form cell was allowed to stand still for 12 hours at 2.7 V and then a constant current of 10 mA was discharged. From the energy amount at the time of discharging, capacitance was calculated in accordance with the following equation:

Total discharge energy $W[W \cdot s] = \{\text{capacitance } C[F] \times (\text{discharge initiation voltage } V[V])^2\}/2$.

As a result, the capacitance (F/cc) per unit volume, which was obtained by multiplying the capacitance/unit mass with a filling density of an electrode, was 32 F/cc. The inner resistance was 21Ω. From the results above, it was confirmed that an extremely high level of capacitance as high as 30 F/cc is obtained according to the electric double-layer capacitor of the present invention. The results are summarized in Table 1 together with the results of other Examples and Comparative Examples.

Example 2

The raw-material carbon composition of Example 1 was processed under an inert gas atmosphere at 650° C. for further one hour to obtain a raw-material carbon composition having a volatile content of 3.3% by mass and microstrength of 13%. The average interlayer distance of microcrystalline carbon was 0.344 nm and porosity was 24%. Thereafter, an alkaline activation process was performed in the same manner as in Example 1 to obtain a carbon material for an electrode. The carbon material had a specific surface area of 900 m²/g, a fine-pore volume of 0.47 cm³/g and a fine-pore diameter of 2.0 nm. Using the carbon material, an electrode was formed and a cell was assembled and capacitance was measured in the same manner as in Example 1. As a result, the capacitance (F/cc) per unit volume was 34 F/cc.

Example 3

The raw-material carbon composition of Example 1 was processed under an inert gas atmosphere at 750° C. for further one hour to obtain a raw-material carbon composition having a volatile content of 1.7% by mass and microstrength of 18%. The average interlayer distance of microcrystalline carbon was 0.343 nm and porosity was 25%. Thereafter, an alkaline activation process was performed in the same manner as in Example 1 to obtain a carbon material for an electrode. The carbon material had a specific surface area of 600 m²/g, a fine-pore volume of 0.30 cm³/g and a fine-pore diameter of 2.1 nm. Using the carbon material, an electrode was formed, a cell was assembled and capacitance was measured in the same manner as in Example 1. As a result, capacitance (F/cc) per unit volume was 35 F/cc.

Example 4

The raw-material carbon composition of Example 1 was used. To 100 parts by mass of the raw-material carbon composition, 200 parts by mass of sodium hydroxide was blended. The mixture was activated in a nitrogen gas atmosphere at 600° C. for one hour. Thereafter, the washing process was carried out in the same manner as in Example 1 to obtain a carbon material for an electrode. The carbon material had a specific surface area of 800 m²/g, a fine-pore volume of 0.45 cm³/g and a fine-pore diameter of 2.2 nm. Using the carbon material, an electrode was formed, a cell was assembled, and capacitance was measured in the same manner as in Example 1. As a result, the capacitance (F/cc) per unit volume was 40 F/cc.

Comparative Example 1

To 90% by volume of bottom oil of a fluid catalytic cracking apparatus for petroleum heavy oil, 10% by volume of the residue oil of a vacuum distillation apparatus was blended to prepare a heavy oil mixture. The heavy oil mixture was carbonized (coking) at 470° C. for one hour to obtain a raw-material carbon composition having a volatile content of 11% by mass, microstrength of 3%, porosity of 17% and $d_{002}=0.350$. Note that the raw-material carbon composition thus obtained had an optically anisotropic texture as observed by a polarization microscope and a flow pattern was dominated.

The raw-material carbon composition thus obtained was activated with an alkali in the same manner as in Example 1 to obtain a carbon material for an electrode. The carbon material had a specific surface area of 2200 m²/g, a fine-pore volume of 1.027 cm³/g and a fine-pore diameter of 1.8 nm.

Using the carbon material, an electrode was formed, a cell was assembled and the capacitance thereof was measured in the same manner as in Example 1. As a result, the capacitance per unit volume (F/cc) was 25 F/cc.

Comparative Example 2

To 10% by volume of bottom oil of a fluid catalytic cracking apparatus for petroleum heavy oil, 90% by volume of the residue oil of a vacuum distillation apparatus was blended to prepare a heavy oil mixture (sulfur content: 4.5% by mass, asphaltene amount: 15.0% by mass). The heavy oil mixture was carbonized (coking) at 500° C. to obtain a raw-material carbon composition having a volatile content of 6.3% by mass and microstrength of 22%. Note that the raw-material carbon composition thus obtained had an optically anisotropic texture as observed by a polarization microscope and a mosaic pattern was dominated.

The raw-material carbon composition thus obtained was activated with an alkali to obtain a carbon material for an electrode. The carbon material had a specific surface area of 1100 m$^2$/g, a fine-pore volume of 0.575 cm$^3$/g and a fine-pore diameter of 2.0 nm.

Using the carbon material, an electrode was formed, a cell was assembled and the capacitance thereof was measured in the same manner as in Example 1. As a result, the capacitance per unit volume (F/cc) was 25 F/cc.

Comparative Example 3

The raw-material carbon composition of Comparative Example 1 was processed in an inert gas atmosphere at 650° C. for further one hour to obtain a raw-material carbon composition having a volatile content of 3.6% by mass, microstrength of 4% and porosity of 39%. A cell was assembled and the capacitance thereof was measured in the same manner as in Example 1. As a result, the capacitance per unit volume (F/cc) was 25 F/cc.

Comparative Example 4

The raw-material carbon composition of Example 1 was processed in an inert gas atmosphere at 900° C. for further one hour to obtain a raw-material carbon composition having a volatile content of 1.0% by mass, microstrength of 25%, porosity of 35%, and $d_{002}$=0.343. Thereafter, alkaline activation was performed in the same manner as in Example 1 to obtain a carbon material for an electrode having a specific surface area of 50 m$^2$/g. A cell was assembled and the capacitance thereof was measured in the same manner as in Example 1. As a result, the capacitance per unit volume (F/cc) was 15 F/cc.

The results of Examples and Comparative Examples are summarized in Table 1.

Example 5

(i) Production of Raw-Material Carbon Composition

Petroleum heavy oil having a sulfur content of 0.25% by mass, an asphaltene amount of 1.5% by mass was carbonized in a batch in an inert gas atmosphere at 470° C. for 6 hours to obtain a raw-material carbon composition having a volatile content of 7.2% by mass, an average interlayer distance $d_{002}$ of a graphite crystal of 0.3435 nm, and microstrength of 10%. The raw-material carbon composition thus obtained showed the properties of easy-graphitization carbon.

(ii) Production of Carbon Material

To 100 parts by mass of the raw-material carbon composition, 200 parts by mass of potassium hydroxide was blended. The mixture was activated in a nitrogen gas atmosphere at 750° C. for one hour. After the reaction, the reaction mixture was washed with water and then with an acid (using HCl) to remove metallic potassium remaining on the carbon material, and dried to obtain a carbon material for an electrode of an electric double-layer capacitor. The specific surface area of the carbon material was 1980 m$^2$ g. The fine-pore volume was 0.91 cm$^3$/g and the fine-pore diameter was 0.18 nm.

(iii) Formation of Electrode

To 80 parts by mass of the carbon material which was ground into an average diameter of 40 μm, 10 parts by mass of carbon black and 10 parts by mass of polytetrafluoroethylene powder were added. The mixture was kneaded in a mortar until paste was obtained. The obtained paste was rolled by a roller press of 180 kPa to form an electrode sheet of 200 μm in thickness.

(iv) Assemble of Cell

Two disks of 16 mm in diameter were punched out from the electrode sheet and dried under vacuum at 120° C., at 13.3 Pa (0.1 Torr) for 2 hours. Thereafter, vacuum impregnating of an

TABLE 1

| | Physical property of raw material carbon composition | | | | After activation | Capacitor performance |
|---|---|---|---|---|---|---|
| | Microstrength (%) | Porosity (%) | Volatile content (% by mass) | X-ray diffraction $d_{002}$ (nm) | Specific surface area (m$^2$/g) | Capacitance per unit volume (F/cc) |
| Example 1 | 7 | 22 | 5.8 | 0.346 | 1980 | 32 |
| Example 2 | 13 | 24 | 3.3 | 0.344 | 900 | 34 |
| Example 3 | 18 | 25 | 1.7 | 0.343 | 600 | 35 |
| Example 4 | 7 | 22 | 5.8 | 0.346 | 800 | 40 |
| Comparative Example 1 | 3 | 17 | 11.0 | 0.350 | 2200 | 25 |
| Comparative Example 2 | 22 | — | 6.3 | — | 1100 | 25 |
| Comparative Example 3 | 4 | 39 | 3.6 | — | — | 25 |
| Comparative Example 4 | 25 | 35 | 1.0 | 0.343 | 50 | 15 | organic electrolytic solution (a solution of triethylmethylammonium tetrafluoroborate in propylene carbonate, concentration: 1 mole/L) to the disks was performed in a glove box under a nitrogen atmosphere having a dew point of −85° C. Next, two electrodes were used as a positive electrode and a negative electrode, respectively. A glass fiber separator (manufactured by ADVANTEC, trade name: GA-200, thickness: 200 μm) was interposed between the electrodes and an aluminum-foil collector was provided to both ends. The resultant construct was installed in a bipolar cell manufactured by Hosen Corporation to form an electric double-layer capacitor (coin-form cell).

The capacitance was measured in the same manner as in Example 1. As a result, the capacitance per unit mass (F/g) was 44.3 F/g and the capacitance per unit volume (F/cc) was 32.1 F/cc. The internal resistance was 21Ω. From the results in the foregoing, it was confirmed that an extremely high level of capacitance as high as 30 F/cc is obtained according to the electric double-layer capacitor of the present invention.

Comparative Example 5

Petroleum heavy oil having a sulfur content of 4.5% by mass, an asphaltene amount of 9.5% by mass was carbonized in an inert gas atmosphere at 480° C. for 4 hours. The resultant raw-material carbon composition had a volatile content of 6.8% by mass; however the microstrength thereof was 3%, which was outside the range of the present invention. The average interlayer distance $d_{002}$ of a graphite crystal was as large as 0.3450 nm.

The raw-material carbon composition was activated with an alkali in the same manner as in Example 5. As a result, the specific surface area of the carbon material after activation was reduced to 1340 m²/g. Furthermore, using the carbon material, an electrode was formed, a cell was assembled and the capacitance was measured in the same manner as in Example 5. As a result, the capacitance per unit mass (F/g) was reduced to 30.9 F/g and the capacitance per unit volume (F/cc) was reduced to 22.0 F/cc. Furthermore, the internal resistance was 36Ω.

Comparative Example 6

Petroleum heavy oil used in Example 5 was carbonized in a nitrogen gas atmosphere at 750° C. for 4 hours. The resultant raw-material carbon composition had an average interlayer distance $d_{002}$ of a graphite crystal of 0.3415 nm and a volatile content of 2.2% by mass and microstrength of 40%. These values were outside the range of the present invention.

The raw-material carbon composition was activated with an alkali in the same manner as in Example 5. As a result, the specific surface area of the carbon material after activation was reduced to 350 m²/g. Furthermore, using the carbon material, an electrode was formed, a cell was assembled and the capacitance was measured in the same manner as in Example 5. As a result, the capacitance per unit mass (F/g) was reduced to 18.2 F/g and the capacitance per unit volume (F/cc) was reduced to 13.4 F/cc. Furthermore, the internal resistance was 40Ω.

The results of Example 5 and Comparative Examples 5 and 6 above are summarized in Table 2.

TABLE 2

| | Physical property of raw-material carbon composition | | | After activation | Capacitor performance | |
|---|---|---|---|---|---|---|
| | Microstrength (%) | Volatile content (% by mass) | X-ray diffraction $d_{002}$ (nm) | Specific surface area (m²/g) | Capacitance per unit volume (F/cc) | Internal resistance (Ω) |
| Example 5 | 10 | 7.2 | 0.3435 | 1980 | 32.1 | 21 |
| Comparative Example 5 | 3 | 6.8 | 0.3450 | 1340 | 22.0 | 36 |
| Comparative Example 6 | 40 | 2.2 | 0.3415 | 350 | 13.4 | 40 |

INDUSTRIAL APPLICABILITY

It is possible to obtain an electric double-layer capacitor having a large capacitance by use of an electrode containing a carbon material for an electrode of the present invention obtained from a raw-material carbon composition according to the present invention. Therefore, the present invention can be very usefully applied to various usages such as automobile power sources, standby power sources for various types of consumer electronics and power sources of portable machines.

The invention claimed is:

1. A raw-material carbon composition for use in a carbon material for an electrode of an electric double-layer capacitor by applying an activation process, wherein the raw-material carbon composition has a volatile content of 1.3% by mass to 15% by mass (both inclusive), and a microstrength of 5 to 30% when the volatile content is less than 6% by mass and 5 to 20% when the volatile content is 6% or more.

2. The raw-material carbon composition according to claim 1, characterized by comprising microcrystalline carbon analogous to graphite.

3. The raw-material carbon composition according to claim 1, wherein the volatile content is not less than 1.3% by mass and less than 6% by mass and porosity of the raw material carbon composition is 20 to 30%.

4. The raw-material carbon composition according to claim 1, wherein the volatile content is 6 to 15% by mass (both inclusive) and an average interlayer distance $d_{002}$ of a graphite crystal in the raw material carbon composition obtained by X-ray diffraction is 0.3445 nm or less.

5. A carbon material for an electrode of an electric double-layer capacitor obtained by applying an activation process to the raw-material carbon composition according to claim 1.

6. The carbon material for an electrode of an electric double-layer capacitor according to claim 5, characterized in that the activation process is one using an alkali metal compound.

7. The carbon material for an electrode of an electric double-layer capacitor according to claim 6, characterized in that the alkali metal compound is sodium hydroxide.

8. A carbon material for an electrode of an electric double-layer capacitor characterized by having a specific surface area of 1800 m²/g or more by activating the raw-material carbon composition according to claim 4.

9. The carbon material for an electrode of an electric double-layer capacitor according to claim 8, characterized in that the activation process is one using an alkali metal compound.

10. An electric double-layer capacitor characterized by comprising an electrode containing the carbon material for an electrode according to claim 5.

11. A carbon material for an electrode of an electric double-layer capacitor obtained by applying an activation process to the raw-material carbon composition according to claim 2.

12. A carbon material for an electrode of an electric double-layer capacitor obtained by applying an activation process to the raw-material carbon composition according to claim 3.

13. The carbon material for an electrode of an electric double-layer capacitor according to claim 11, characterized in that the activation process is one using an alkali metal compound.

14. The carbon material for an electrode of an electric double-layer capacitor according to claim 12, characterized in that the activation process is one using an alkali metal compound.

15. The carbon material for an electrode of an electric double-layer capacitor according to claim 13, characterized in that the alkali metal compound is sodium hydroxide.

16. The carbon material for an electrode of an electric double-layer capacitor according to claim 14, characterized in that the alkali metal compound is sodium hydroxide.

17. An electric double-layer capacitor characterized by comprising an electrode containing the carbon material for an electrode according to claim 6.

18. An electric double-layer capacitor characterized by comprising an electrode containing the carbon material for an electrode according to claim 7.

19. An electric double-layer capacitor characterized by comprising an electrode containing the carbon material for an electrode according to claim 8.

20. An electric double-layer capacitor characterized by comprising an electrode containing the carbon material for an electrode according to claim 9.

* * * * *